(12) United States Patent
Gittleman et al.

(10) Patent No.: US 6,309,445 B1
(45) Date of Patent: Oct. 30, 2001

(54) REMOVAL OF CARBON DIOXIDE FROM GAS STREAMS

(75) Inventors: Craig S. Gittleman, Fanwood; Adeola Florence Ojo, Scotch Plains; Frank R. Fitch, Bedminster; Martin Bulow, Basking Ridge; Vijay R. Balse, Chatham, all of NJ (US); Philip Connolly, Philadelphia, PA (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/442,973

(22) Filed: Nov. 18, 1999

Related U.S. Application Data

(63) Continuation-in-part of application No. 09/041,234, filed on Mar. 12, 1998, now abandoned.

(51) Int. Cl.[7] ............................. B01D 53/04; B01D 53/26
(52) U.S. Cl. ..................... 95/96; 95/106; 95/120; 95/126; 95/139; 95/902
(58) Field of Search ................. 95/96, 114, 130, 95/139, 117–120, 123, 902, 106, 126

(56) References Cited

U.S. PATENT DOCUMENTS

| | | | |
|---|---|---|---|
| 3,078,639 | * 2/1963 | Milton | .................................... 95/139 |
| 3,885,927 | * 5/1975 | Sherman et al. | ........................ 95/139 |
| 3,982,912 | * 9/1976 | Yatsurugi et al. | ................. 95/139 X |
| 4,493,715 | * 1/1985 | Hogan et al. | ........................... 95/139 |
| 4,775,396 | * 10/1988 | Rastelli et al. | ..................... 95/139 X |
| 4,935,580 | * 6/1990 | Chao et al. | ............................ 95/139 |
| 4,957,514 | * 9/1990 | Golden et al. | ..................... 95/139 X |
| 4,964,889 | * 10/1990 | Chao | ................................... 95/139 X |
| 5,156,657 | * 10/1992 | Jain et al. | .......................... 95/139 X |
| 5,300,138 | * 4/1994 | Fischer et al. | ..................... 95/117 X |
| 5,531,808 | * 7/1996 | Ojo et al. | ................................. 95/96 |
| 5,536,301 | * 7/1996 | Lansbarkis et al. | ............... 95/123 X |
| 5,560,763 | * 10/1996 | Kumar | ............................... 95/139 X |
| 5,587,003 | * 12/1996 | Bulow et al. | ...................... 95/139 X |
| 5,656,067 | * 8/1997 | Watson et al. | ..................... 95/139 X |
| 5,858,068 | * 1/1999 | Lansbarkis et al. | ............... 95/143 X |
| 5,897,686 | * 4/1999 | Golden et al. | ..................... 95/139 X |
| 6,024,781 | * 2/2000 | Bulow et al. | ...................... 95/139 X |

* cited by examiner

*Primary Examiner*—Robert H. Spitzer
(74) *Attorney, Agent, or Firm*—Philip H. Von Neida; Salvatore P. Pace

(57) ABSTRACT

Carbon dioxide is removed from gas streams comprised predominantly of gases that are less strongly adsorbed than is carbon dioxide by passing the gas stream through a bed of type X zeolite having a silicon to aluminum atomic ratio not greater than about 1.15 and at least 75% of the exchangeable cations of which are potassium ions, thereby adsorbing the carbon dioxide from the gas stream. The process is particularly advantageous when applied to the removal of low levels of carbon dioxide from gas streams at temperatures of about 0 to 80° C.

13 Claims, 2 Drawing Sheets

REMOVAL OF CARBON DIOXIDE FROM GAS STREAMS

The present application is a continuation-in-part application of Ser. No. 09/041,234, filed Mar. 12, 1998, now abandoned.

FIELD OF THE INVENTION

This invention relates to the removal of carbon dioxide from gas streams, and more particularly to the prepurification of air by the removal of carbon dioxide from air prior to air separation.

BACKGROUND OF THE INVENTION

Gases that occur in nature or which are produced in industrial processes often contain carbon dioxide in small amounts. For example, atmospheric air generally contains about 350 parts per million (ppm) carbon dioxide. Because of certain process constraints or a particular end use that the gas is intended for, it may sometimes be desirable or necessary to remove the carbon dioxide from the gas. For example, air that is separated into various component products by cryogenic separation techniques (cryogenic air separation), such as cryogenic distillation or cryogenic adsorption, must be substantially free of both carbon dioxide and moisture, because these operations are carried out at temperatures below the freezing points of these compounds; consequently, if they are not removed they will freeze in and eventually clog the air separation process equipment.

Small amounts of carbon dioxide and moisture are removed from gas streams by various techniques, such as condensation, reversing heat exchange freezing and adsorption. A particularly preferred method is adsorption using an adsorbent which adsorbs carbon dioxide (and water vapor) more strongly than it adsorbs other components of the gas stream. For example, it is common to remove carbon dioxide from an air stream that is to be cryogenically separated, by passing the gas stream through a bed of zeolite 13X. U.S. Pat. No. 3,885,927, issued to Sherman et al. on May 27, 1975, discloses the use of type X zeolite containing at least 90 equivalent percent barium cations for the removal of carbon dioxide from gas streams containing not more than 1000 ppm carbon dioxide, at temperatures of −40 to 120° F. U.S. Pat. No. 4,775,396, issued to Rastelli et al. on Oct. 4, 1988, discloses the adsorption of carbon dioxide from gas streams by pressure swing adsorption at temperatures of −50 to 100° C., the adsorbent having a $SiO_2/Al_2O_3$ molar ratio of from 2 to 100 and containing at least 20 equivalent percent of one or more cations selected from zinc, rare earth, hydrogen and ammonium cations and not more than 80 equivalent percent of alkali metal or alkaline earth metal cations.

Zeolite 13X efficiently removes small amounts of carbon dioxide (and water vapor) from air streams at low temperatures, i. e., temperatures of about 5° C. or lower, because it more strongly adsorbs these components than it adsorbs nitrogen, oxygen or argon. However, the carbon dioxide adsorption capacity of zeolite 13X diminishes rapidly as the temperature of the gas being separated increases, and the separation process becomes infeasible at temperatures above about 20° C. Since ambient 25 temperatures are often considerably above the preferred 5° C. adsorption temperature, for example ambient temperatures of 40° C. or higher are sometimes encountered, and since, because of the heat of adsorption and the heat of gas compression, there is a tendency for adsorption bed temperatures to increase considerably during the course of an adsorption process, it is usually necessary to cool the air fed to an adsorption-based air prepurification plant by means of external refrigeration to maintain the gas at temperatures below 20° C. This reduces the overall efficiency of the air separation process, since energy must be consumed to provide the necessary refrigeration. U.S. Pat. No. 5,531,808, issued to Ojo et al. discloses the removal of carbon dioxide from gas streams by adsorption using as the adsorbent type X zeolite having as exchangeable cations one or more of various cations, including cations of Group 1A of the periodic table. U.S. Pat. No. 5,300,138, issued to Fischer et al. teaches that the performance of a rotary regeneratable dehumidification wheel is enhanced by using type X molecular sieves in which 20 to 60% of the sodium cations are replaced by potassium. The enhanced performance is attributed to a relatively lower sorption capacity for moisture on the partially potassium exchanged molecular sieve which allows the adsorbent to be regenerated at lower temperatures.

It would be desirable to find improved processes for removing carbon dioxide from gas streams using adsorbents with exceptionally high affinities for carbon dioxide. The present invention provides a carbon dioxide adsorption process which provides such an advantage.

SUMMARY OF THE INVENTION

According to the invention, a gas stream is purified by the removal of carbon dioxide from the gas stream by passing the gas stream through a bed of type X zeolite having a silicon-to-aluminum atomic ratio in the range of about 1.0 to about 1.15 and having as exchangeable cations potassium ions at a temperature in the range of about −50 to about 80° C., wherein at least 75% of the exchangeable cations on the zeolite are potassium ions. The process of the invention can be used to purify any gas that interacts less strongly with the zeolite than does carbon dioxide and which contains carbon dioxide as an impurity. The process is particularly suitable for purifying gases in which the partial pressure of carbon dioxide is in the range of about 3 to about 30 torr. Typical of gases that can be purified by the process of the invention are air, nitrogen, oxygen, argon, hydrogen, helium, neon, xenon, krypton, methane, etc., and mixtures of these.

Preferred adsorbents are X zeolites comprised substantially of potassium ions or potassium and sodium ions. The most preferred adsorbent is potassium X zeolite, i. e., zeolite X having substantially only potassium ions as its exchangeable cation.

In a preferred embodiment of the invention, the type X zeolite has a silicon-to-aluminum atomic ratio of about 1.0 to about 1.1, and in the most preferred embodiment, it has a silicon-to-aluminum atomic ratio of about 1.0.

The adsorption step of the process of the invention is preferably carried out at temperatures in the range of about 0 to about 80° C., and it is most preferably carried out at temperatures in the range of about 20 to about 70° C.

The invention is particularly suitable for removing carbon dioxide from gas streams containing carbon dioxide at partial pressures in the range of about 1 to about 40 torr, and is exceptionally useful for removing carbon dioxide from gas streams containing carbon dioxide at a partial pressure in the range of about 3 to about 30 torr.

The carbon dioxide purification is preferably carried out by a cyclic process, more preferably as pressure swing adsorption (PSA), temperature swing adsorption (TSA), or combinations of these. In the most preferred embodiment, the process is a TSA process.

The process of the invention can comprise the single operation of carbon dioxide adsorption, or it may comprise a combination of separation and purification operations, including carbon dioxide adsorption and one or more of water removal, air separation, hydrogen oxidation, carbon monoxide oxidation, etc. In a preferred procedure carbon dioxide is removed from air by the above-described adsorption method and the purified air is separated by cryogenic distillation into nitrogen, oxygen, argon or mixtures of these.

The carbon dioxide adsorption step with the type X adsorbent can also be used to remove moisture from the gas stream, if present. In a preferred embodiment, moisture is removed prior to carbon dioxide adsorption by passing the gas stream through a desiccant, preferably one of the various types of alumina, silica gel or zeolites, or mixtures of these.

DETAILED DESCRIPTION OF THE INVENTION

Figure 1:
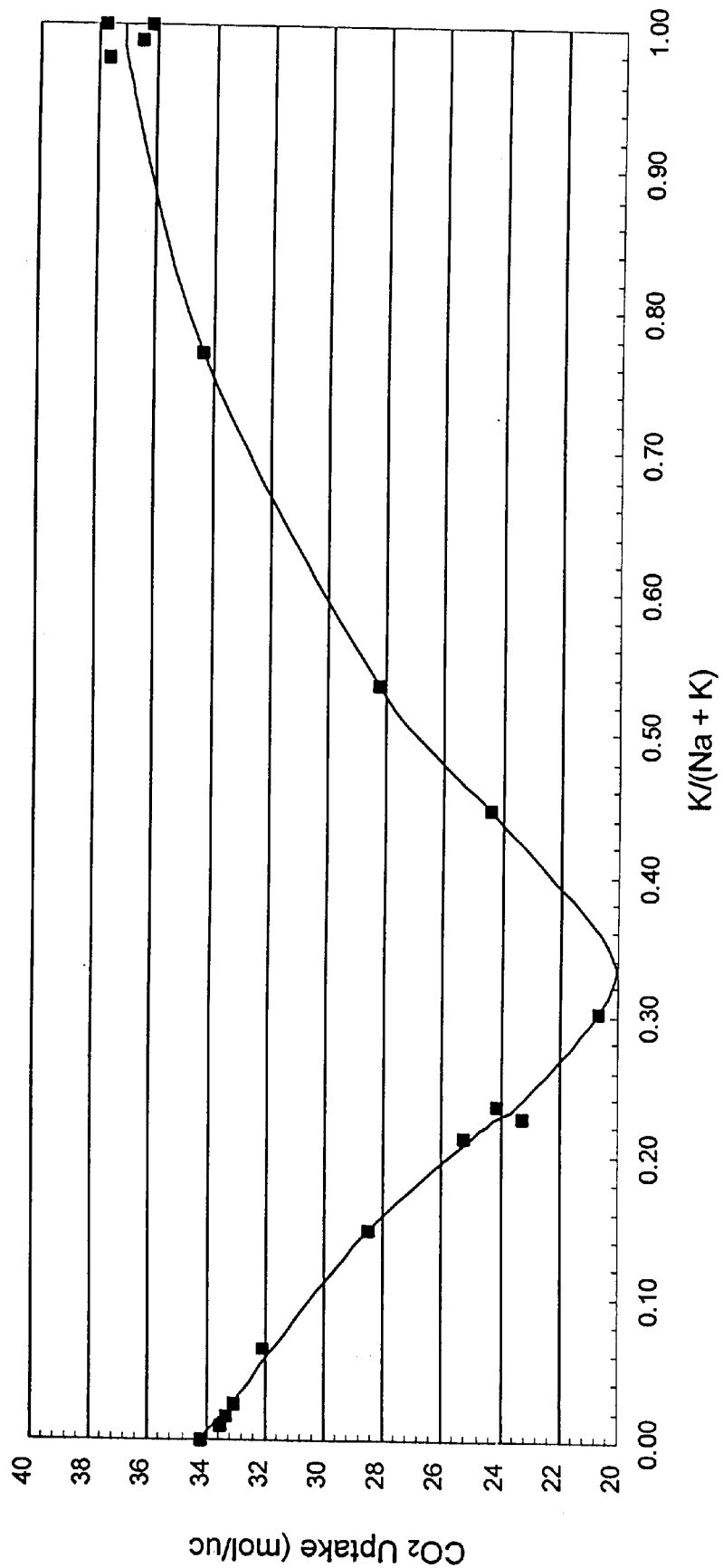
FIG. 1 is a graphical representation of the relationship between carbon dioxide uptake and the potassium exchange level of LSX.

The process of the invention is particularly useful for removing carbon dioxide at low concentrations, i. e., parts per million (ppm) levels, from gas streams at temperatures above about 0° C. Although the process can be successfully used to remove carbon dioxide from gas streams in which the carbon dioxide is present at partial pressures greater than about 30 torr, it is most effective for removing carbon dioxide from a gas stream when the carbon dioxide is present in the gas stream at concentrations such that its partial pressure in the gas stream is in the range of about 3 to about 30 torr, as discussed above.

The adsorbents useful in the process of the invention are the type X zeolites having silicon-to-aluminum atomic ratios not greater than about 1.15, i. e., those having silicon-to-aluminum atomic ratios in the range of 1.0 to about 1.15. Preferred adsorbents for use in the invention are the type X zeolites having silicon-to-aluminum atomic ratios in the range of about 1.0 to 1.1, and the most preferred adsorbents are those having silicon-to-aluminum atomic ratios of about 1.0, commonly referred to as low silicon X or LSX zeolites. Due to defects in the structure of the zeolite, impurities, such as occluded alumina and/or aluminates and errors in analytical measurements, apparent silicon-to-aluminum ratios of type X zeolites as low as 0.9 have been reported. However, the theoretical minimum silicon-to-aluminum atomic ratio is 1.0, and this theoretical minimum is used herein, and it is intended that type X zeolites of the lowest possible silicon-to-aluminum atomic ratio be included within the scope of this invention.

The zeolites may be "potassium X" zeolites, i. e., type X zeolite whose exchangeable cations are substantially all potassium ions, or they may be type X zeolites having up to about 25% of its cations as exchangeable cations ions other than potassium ions, provided that ions other than group 1A ions are not present at exchange levels greater than about 15%. Included among the ions other than potassium that may occupy exchangeable cation sites on the type X zeolite are other ions of Group 1A, e. g. sodium, lithium, etc., ions of Groups 2A, 3A, 3B of the periodic table, the ammonium ion, the hydronium ion or mixtures of two or more ions from any of these categories. Preferably the type X zeolite contains as exchangeable cations only potassium and sodium ions, i. e., about 75 to 100% potassium ions and 0 to about 25% sodium ions. As noted above, the most preferred adsorbent is type X zeolite having only potassium ions as its exchangeable cations.

The process of the invention may be carried out in a single adsorption vessel or a battery of two or more beds arranged in parallel and adapted to be operated in a cyclic process comprising adsorption and desorption. In such systems the beds are cycled out of phase to assure a pseudo-continuous flow of purified gas from the adsorption system.

The process of the invention is generally practiced as a cyclical process, such as temperature swing adsorption, pressure swing adsorption, vacuum swing adsorption, or combinations of these. The process is particularly useful for removing small amounts of carbon dioxide from air by temperature swing adsorption. The carbon dioxide removal process is ideally coupled with an air separation process, such as cryogenic distillation of air, to produce high purity nitrogen, oxygen, argon or mixtures of these high purity gas products.

The temperature at which the adsorption step is carried out may vary from a minimum temperature of about −50° C. to a maximum of about 80° C. It has been discovered that the process of the invention is considerably more efficient at temperatures greater than about 20° C. than corresponding processes using conventional adsorbents, particularly when the gas stream being purified contains carbon dioxide at concentrations such that its partial pressure in the gas stream does not exceed about 30 torr. This feature makes the process advantageous for use in warm weather climates where the temperature during the adsorption step is above about 20° C., or even above about 30° C. Although the adsorption process can be carried out at temperatures up to about 80° C., it is preferable that the temperature not exceed about 60° C. and most preferable that it not exceed about 50° C.

The total pressure at which the adsorption step is carried out generally ranges from about 0.2 to about 50 bar, and preferably from about 1 to 40 bar.

When the adsorption process is PSA the regeneration step is generally carried out at temperatures in the neighborhood of the temperature at which the adsorption step is carried out and at an absolute pressure lower than the adsorption pressure. The pressure during the regeneration step of PSA cycles is usually in the range of about 20 to about 5000 mbara, and preferably in the range of about 100 to about 2000 mbara. When the adsorption process is TSA, bed regeneration is carried out at a temperature higher than the adsorption temperature, usually in the range of about 50 to about 250° C., and preferably in the range of about 100 to 200° C. When a combination of PSA and TSA is used the temperature and pressure during the bed regeneration step are higher and lower, respectively, than they are during the adsorption step.

In starting a cyclical process according to the invention, the gaseous feed stream from which carbon dioxide is to be removed is introduced into an adsorption vessel containing a bed of the above-mentioned adsorbent. As the gas passes through the bed of adsorbent, carbon dioxide is adsorbed and a substantially carbon dioxide-free nonadsorbed product gas passes out of the adsorption vessel through the nonadsorbed gas outlet. As the adsorption step proceeds, a carbon dioxide front forms in the adsorbent bed and moves toward the nonadsorbed gas outlet end of the bed. When the adsorbed carbon dioxide front traveling through the adsorption vessel (s) in which the adsorption step is being carried out reaches the desired point in the vessel(s), the adsorption process in these vessel(s) is terminated and these vessels enter the regeneration mode. During regeneration, the carbon dioxide-loaded vessels are depressurized, if the adsorption cycle is pressure swing adsorption, or heated, if a temperature swing adsorption cycle is employed, or both depressurized and heated, if a combination process is used.

The method of regeneration of the adsorption beds depends upon the type of adsorption process employed. In the case of pressure swing adsorption, the regeneration phase generally includes a countercurrent depressurization step during which the beds are vented countercurrently until they attain the desired lower pressure. If desired the pressure in the beds may be reduced to subatmospheric pressure by means of a vacuum inducing device, such as a vacuum pump.

In some cases, in addition to the countercurrent depressurization step(s), it may be desirable to countercurrently purge the bed with the nonadsorbed product gas stream exiting the adsorbent bed(s). In this case the bed(s) may be countercurrently purged with nonadsorbed gas, and the purge step is usually initiated towards the end of the countercurrent depressurization step, or subsequent thereto. During this purge step, the purge gas can be introduced into the adsorbent bed from an intermediate storage facility when the adsorption system comprises a single adsorber; or from another adsorber that is in the adsorption phase, when the adsorption system comprises multiple adsorbers arranged in parallel and operated out of phase.

The adsorption cycle may contain steps other than the fundamental steps of adsorption and regeneration. For example, it may be advantageous to depressurize the adsorption bed in multiple steps, with the first depressurization product being used to partially pressurize another bed in the adsorption system. This will further reduce the amount of gaseous impurities in the nonadsorbed product gas.

According to a preferred embodiment of the invention, a gas stream, such as air, is introduced into an adsorption vessel containing a low silicon X zeolite of the type described above. The gas stream may be at a temperature as low as −50° C. or less, or as high as 80° C. Preferably, the concentration of carbon dioxide in the gas stream is not so great that its partial pressure significantly exceeds about 30 torr. Substantially all of the carbon dioxide will be removed from the gas stream, and the substantially carbon dioxide-free product gas will issue from the nonadsorbed product gas outlet of the adsorption vessel. When the carbon dioxide adsorption front reaches a predetermined point in the adsorption vessel, usually near the nonadsorbed product gas outlet, the adsorption process in the vessel is terminated, and the adsorbent bed contained in the vessel is regenerated in one of the methods described above. If the adsorption plant is a multiple bed system, adsorption will immediately begin in a second bed, so that the continuity of the purification process will not be interrupted.

The purified gas can be subjected to further processing. For example, in cryogenic air separation operations, the prepurified air is sent to a cryogenic distillation (or adsorption) plant for fractionation into one or more high purity gases, e. g. 90% pure oxygen, nitrogen or argon. If desired, a waste gas stream from the air separation plant can be recycled to the prepurification plant for use as purge gas during bed regeneration. The above process can be conducted efficiently for an indefinite period of time, since the effectiveness of the adsorption process will not be substantially adversely affected by temperature increases occurring during the adsorption process.

It will be appreciated that it is within the scope of the present invention to utilize conventional equipment to monitor and automatically regulate the flow of gases within the system so that it can be fully automated to run continuously in an efficient manner.

The invention is further illustrated by the following examples in which, unless otherwise indicated, parts, percentages and ratios are on a molar basis.

EXAMPLE 1

A mixed potassium and sodium form of type X zeolite powder (Na,KLSX) with a Si/Al atomic ratio of 1.0 was synthesized according to the procedure described by Kuehl and Sherry in UK Patent No. 1,580,928. About 23% of the zeolite's exchangeable cations were potassium ions, and about 77% were sodium ions. Sodium LSX (NaLSX) zeolite powder was prepared by ion-exchange of the as-synthesized Na,KLSX zeolite powder using four static exchanges at 80° C. with 1.0 N NaCl solution per gram of zeolite. After each exchange, the sample was washed with 0.01 N aqueous NaOH. Various exchange levels of KLSX samples were prepared from either the as-synthesized Na,KLSX powder or from the NaLSX powder, by adding separate samples of the powder to either aqueous KCl or NaCl solutions having normalities in the range of 0.01–1.00 N. The mixtures were stirred at 80° C. for about 16 hours. The potassium LSX samples were filtered and washed with aqueous KOH (0.01 N) and dried overnight at ambient temperature.

The samples were analyzed by Inductively Coupled Plasma Atomic Emission Spectroscopy (ICP-AES) using an ARL-3510 Sequential ICP spectrometer. The compositions of the samples prepared according to the above procedure are given in the Table.

EXAMPLE 2

Adsorption equilibria for carbon dioxide were measured at 25° C. using a Cl microbalance at carbon dioxide partial pressures ranging from 0 to 40 torr for the series of NaKLSX adsorbents shown in the Table. Each sample of adsorbent (about 100 mg) was activated in situ by being evacuated at 350° C. and $10^{-5}$ torr for 1.5 hours. Each test was conducted until equilibrium was achieved. The carbon dioxide uptakes at 5 torr carbon dioxide partial pressure in molecules per unit cell is reported in the Table and plotted in FIG. 1, which shows carbon dioxide uptake vs. the ratio of potassium ions to total exchangeable cations of the adsorbent. The curve presented in FIG. 1 illustrates that the carbon dioxide uptake for the NaKLSX adsorbent decreases as the mole fraction of potassium ions increases from 0 to about 0.3 and then increases as the mole fraction of potassium ions increases from about 0.3 to 1. Based on the values in the range of 0 to about 0.23 mole ratio potassium ions and the findings of Fischer et. al. in U.S. Pat. No. 5,300,138 that moisture uptakes on type X molecular sieves in which 20 to 60% of the sodium cations are replaced by potassium are lower than that of type X molecular sieves with only sodium cations, it would be expected that the carbon dioxide uptake for completely potassium-exchanged LSX would be less than the uptake obtained at the zero potassium ion level. It was, however, greater than the substantially fully sodium-exchanged LSX.

TABLE

CO$_2$ Uptake on NaK LSX at 25° C. and 5 torr

| Run | %K | CO$_2$ Uptake (mmol/UC) |
|---|---|---|
| 1 | 0.04 | 34.17 |
| 2 | 0.91 | 33.50 |
| 3 | 1.61 | 33.34 |
| 4 | 2.50 | 33.02 |
| 5 | 6.41 | 32.05 |
| 6 | 14.7 | 28.48 |
| 7 | 21.2 | 25.24 |
| 8 | 22.6 | 23.26 |
| 9 | 23.4 | 24.09 |
| 10 | 30.3 | 20.67 |
| 11 | 44.7 | 24.40 |
| 12 | 53.4 | 28.24 |
| 13 | 76.8 | 34.28 |
| 14 | 97.6 | 37.62 |
| 15 | 98.9 | 36.50 |
| 16 | 100 | 37.72 |
| 17 | 100 | 36.18 |

EXAMPLE 3

Equilibrium adsorption isotherms for carbon dioxide were measured using a Cl microbalance at a series of pressures in the range of 0 to about 38 torr at 25° C. for samples of KLSX (silicon-to-aluminum atomic ratio of 1.02), NaLSX and NaKLSX (about 77% Na ions and 23% K ions). Each sample of adsorbent (about 100 mg) was activated in situ by being evacuated at 350° C. and $10^{-5}$ torr for 1.5 hours. Each test was conducted until sorption equilibrium was achieved.

Figure 2:
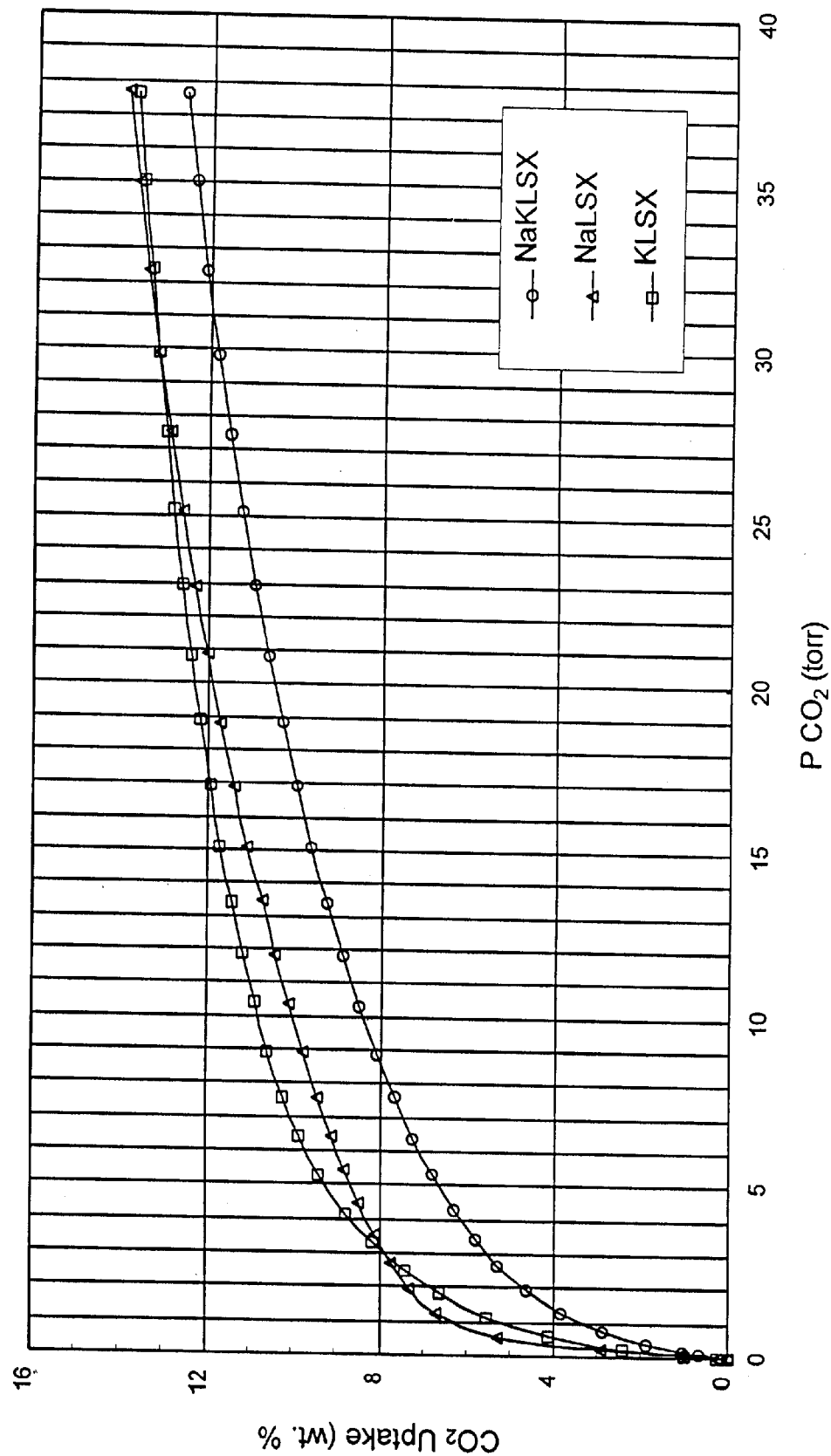
FIG. 2 is a graphical representation of the relationship between carbon dioxide uptake and carbon dioxide partial pressure on low silicon type X zeolite (LSX) exchanged with sodium, potassium and mixed sodium and potassium ions.

FIG. 2 is a graphical representation of the data collected in Example 3, showing carbon dioxide uptake vs. carbon dioxide partial pressure curves for each of the three adsorbents. The curves presented in FIG. 2 illustrate that the carbon dioxide uptake for the KLSX adsorbent is greater than that for the NaLSX for carbon dioxide partial pressures in the range of about 3 to about 30 torr. FIG. 2 also shows that the carbon dioxide uptake for the NaKLSX adsorbent is less than that for the KLSX adsorbent for all partial pressure values in the tested range.

Although the invention has been described with particular reference to specific embodiments and experiments, these are merely exemplary of the invention and variations are contemplated. The scope of the invention is limited only by the breadth of the appended claims.

What is claimed is:

1. A method of removing carbon dioxide from a gas stream comprising subjecting said gas stream to adsorption using type X zeolite having a silicon to aluminum atomic ratio in the range of about 1.0 to about 1.15 at a temperature in the range of about −50 to about 80° C., wherein at least 75% of the exchangeable cations of the type X zeolite are potassium ions.

2. The method of claim 1, wherein said adsorption is part of a cyclic adsorption process selected from temperature swing adsorption, pressure swing adsorption, vacuum swing adsorption and combinations of these.

3. The method of claim 2, wherein said adsorbent is type X zeolite having a silicon to aluminum atomic ratio in the range of about 1.0 to 1.1.

4. The method of claim 2, wherein said adsorption is carried out at a temperature in the range of about 0 to about 80° C.

5. The method of any one of claims 1 to 4, wherein 0 to about 25% of said exchangeable cations are sodium ions.

6. The method of claim 5, wherein the partial pressure of carbon dioxide in said gas stream is in the range of about 1 to about 40 torr.

7. The method of claim 5, wherein said adsorbent is type X zeolite substantially all of whose exchangeable cations are potassium ions.

8. The method of claim 7, wherein said adsorption is carried out at a temperature in the range of about 20 to about 70° C.

9. The method of claim 7, wherein the partial pressure of carbon dioxide in said gas stream is in the range of about 3 to about 30 torr.

10. The method of claim 7, wherein said gas stream is oxygen, nitrogen, argon, hydrogen, helium, neon, xenon, krypton or mixtures of these.

11. The method of claim 10, wherein the adsorbent is type X zeolite having a silicon-to-aluminum atomic ratio of about 1.0.

12. The method of claim 10, wherein said gas stream is air.

13. The method of claim 12, additionally comprising, prior to removing carbon dioxide from said gas stream, removing water vapor from the gas stream by passing the gas stream through an adsorbent selected from alumina, silica gel, zeolites, and mixtures of these.

* * * * *